(12) United States Patent
Palomba et al.

(10) Patent No.: US 7,575,280 B2
(45) Date of Patent: Aug. 18, 2009

(54) LATCH MECHANISM AND A VEHICLE SEAT HAVING A LATCH MECHANISM

(75) Inventors: Michele Palomba, Romeo, MI (US); Chad Balk, Birmingham, MI (US); Matthew Kipf, Farmington Hills, MI (US); James C. Dalian, Pinckney, MI (US)

(73) Assignee: Lear Corporation, Southfield, MI (US)

( * ) Notice: Subject to any disclaimer, the term of this patent is extended or adjusted under 35 U.S.C. 154(b) by 478 days.

(21) Appl. No.: 11/275,451

(22) Filed: Jan. 5, 2006
(Under 37 CFR 1.47)

(65) Prior Publication Data

US 2007/0152484 A1    Jul. 5, 2007

(51) Int. Cl.
*B60N 2/10* (2006.01)

(52) U.S. Cl. .................................... 297/336; 296/65.03

(58) Field of Classification Search ................ 297/335, 297/336; 296/65.1, 65.03, 65.05, 65.08, 296/65.09, 65.16
See application file for complete search history.

(56) References Cited

U.S. PATENT DOCUMENTS

| 5,383,699 | A | * | 1/1995 | Woziekonski et al. .... 296/65.09 |
| 5,390,980 | A | | 2/1995 | Premji et al. |
| 5,730,480 | A | | 3/1998 | Takamura |
| 5,743,596 | A | * | 4/1998 | Chabanne ................. 297/463.1 |
| 5,997,069 | A | | 12/1999 | Coffey et al. |
| 6,012,747 | A | * | 1/2000 | Takamura et al. ........... 292/216 |
| 6,036,252 | A | * | 3/2000 | Hecksel et al. ........... 296/65.03 |
| 6,039,401 | A | | 3/2000 | Rus |
| 6,123,379 | A | * | 9/2000 | Yamada et al. ........... 296/65.03 |
| 6,152,515 | A | | 11/2000 | Wieclawski |
| 6,213,525 | B1 | | 4/2001 | Nicola |
| 6,290,297 | B1 | * | 9/2001 | Yu ......................... 297/378.12 |
| 6,375,245 | B1 | | 4/2002 | Seibold et al. |
| 6,412,849 | B1 | * | 7/2002 | Fast ......................... 296/65.03 |
| 6,629,710 | B1 | | 10/2003 | Shafry et al. |
| 6,908,137 | B2 | | 6/2005 | Doxey et al. |
| 6,945,585 | B1 | * | 9/2005 | Liu et al. .................. 296/65.03 |
| 6,991,293 | B2 | * | 1/2006 | Lang et al. .................... 297/336 |
| 7,325,874 | B2 | * | 2/2008 | Zhang ......................... 297/336 |
| 2005/0212338 | A1 | | 9/2005 | Muller et al. |

FOREIGN PATENT DOCUMENTS

DE    199 02 561 A1    8/2000

* cited by examiner

*Primary Examiner*—Peter R. Brown
(74) *Attorney, Agent, or Firm*—MacMillan, Sobanski & Todd, LLC

(57) ABSTRACT

A latch mechanism and a vehicle seat having a latch mechanism. The latch mechanism includes a mounting plate, a latch, a pawl, and a cam. The latch, pawl, and cam are rotatably disposed on the mounting plate. The pawl engages the latch before the cam engages the latch to inhibit rotation of the latch. The pawl and cam disengage from the latch to permit the latch to rotate.

10 Claims, 4 Drawing Sheets

LATCH MECHANISM AND A VEHICLE SEAT HAVING A LATCH MECHANISM

BACKGROUND OF THE INVENTION

Field of the Invention

The present invention relates to a latch mechanism and a vehicle seat having a latch mechanism.

SUMMARY OF THE INVENTION

In at least one embodiment of the present invention, a latch mechanism for a vehicle seat is provided. The latch mechanism includes a mounting plate, a latch, a pawl, and a cam. The latch is rotatably disposed on the mounting plate and is configured to rotate about a first axis of rotation. The pawl and the cam are rotatably disposed on the mounting plate and are configured to rotate about a second axis of rotation. The pawl engages the latch before the cam engages the latch to inhibit rotation of the latch. The pawl and the cam disengage from the latch to permit the latch to rotate.

In at least one other embodiment of the present invention, a latch mechanism for a vehicle seat is provided. The latch mechanism includes a latch, a cam, and a pawl. The latch rotates about a first axis of rotation. The cam rotates about a second axis of rotation and has a slot that is radially disposed relative to the second axis of rotation. The pawl rotates about the second axis of rotation and has an engagement pin. The engagement pin is disposed generally parallel to the second axis of rotation and extends into the slot. The engagement pin engages an end of the slot to rotate the cam away from the latch when the pawl is rotated away from the latch.

In at least one embodiment, a vehicle seat having a latch mechanism for detachably mounting the vehicle seat to a vehicle is provided. The vehicle seat includes a seat bottom, a latch mechanism disposed on the seat bottom, and an actuator. The latch mechanism includes a mounting plate, a latch, a cam, and a pawl. The latch is disposed on the mounting plate and is rotatable between a latched position and an unlatched position. The latch includes a hook portion. The cam is rotatably disposed on the mounting plate and has a slot. The pawl is rotatably disposed on the mounting plate and has an engagement pin disposed in the slot. The actuator is connected to the pawl. Actuation of the actuator rotates the pawl away from the latch such that the engagement pin moves within the slot to engage the cam and rotate the cam away from the latch, thereby permitting the latch to rotate from the latched position toward the unlatched position.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
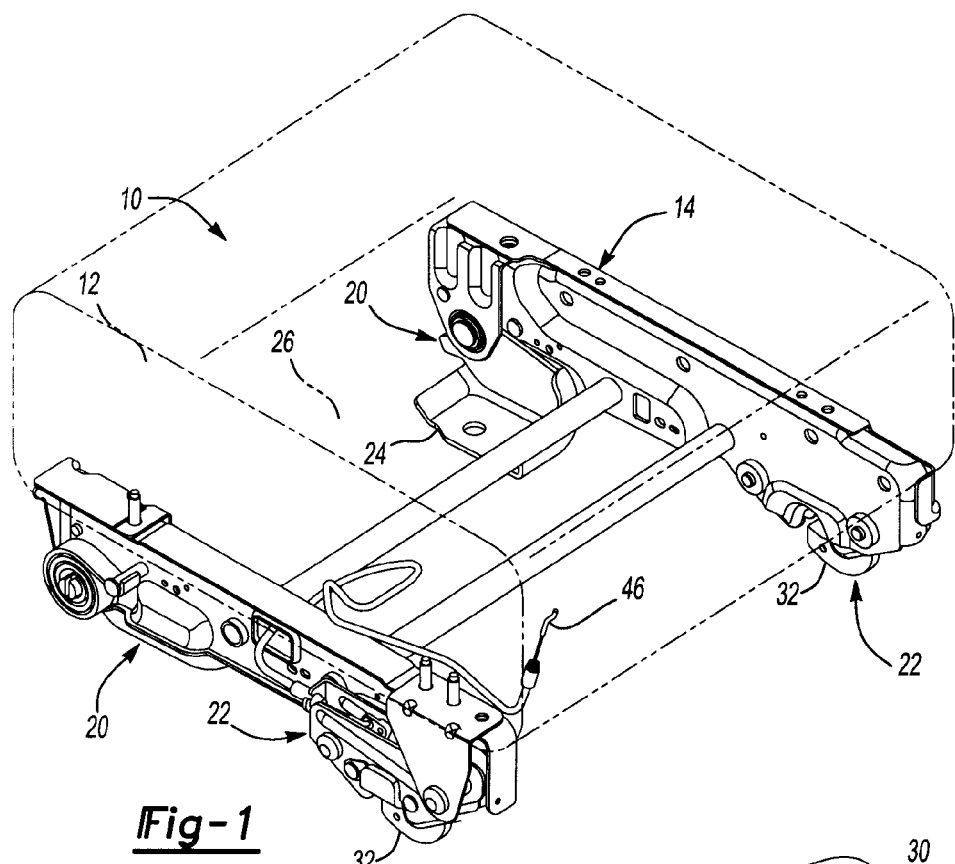
FIG. 1 is a perspective view of a portion of an exemplary vehicle seat having a frame and a latch mechanism.

Referring to FIG. 1, a portion of an exemplary vehicle seat 10 is shown. The vehicle seat 10 may have any suitable configuration. In the embodiment shown, the vehicle seat 10 includes a seat bottom 12 that is depicted in phantom to more clearly illustrate a frame 14 that may be provided with the seat bottom 12. The vehicle seat 10 may also include a seat back in one or more embodiments of the present invention.

The frame 14 may be attached to and/or at least partially disposed in the seat bottom 12. The frame 14 may have any suitable configuration. In at least one embodiment, the frame 14 may include at least one pivot mechanism 20 and at least one latch mechanism 22. In other embodiments, the pivot mechanism may be omitted and a plurality of similarly or differently configured latch mechanisms may be provided that allow the seat 10 to be disengaged and/or removed from the vehicle.

The pivot mechanism 20, if provided, may be configured to allow at least a portion of the seat 10 to pivot with respect to the vehicle. More specifically, the pivot mechanism 20 may include a mounting portion 24 that may be secured to the vehicle in any suitable manner, such as with a fastener like a bolt. In addition, the pivot mechanism 20 may be configured to allow the frame 14 to pivot about a pivot axis 26 when the latch mechanism 22 is in an unlatched position as described in more detail below. The pivot mechanism 20 may be provided in any suitable location. In the embodiment shown in FIG. 1, the pivot mechanism 20 is provided near a front side of the vehicle seat 10.

Figure 3:
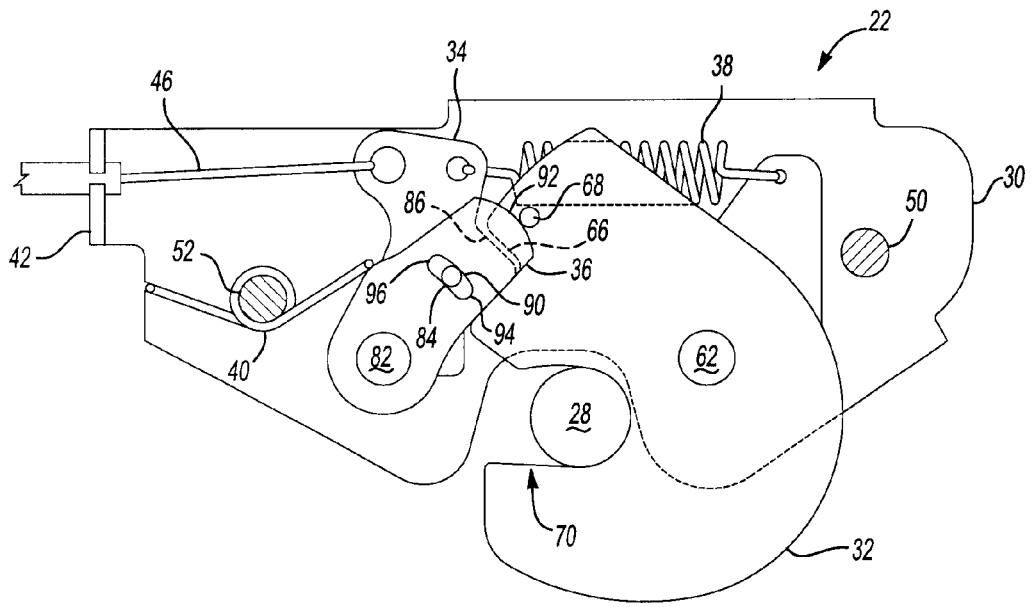
FIG. 3 is a side view of the latch mechanism showing a latch in a latched position.

The latch mechanism 22 may be selectively attached to and detached from the vehicle. More specifically, the latch mechanism 22 may be configured to engage a mounting feature 28, such as a shaft or striker disposed on the vehicle, to secure the seat 10 as is best shown in FIG. 3. The latch mechanism 22 may be provided in any suitable location. In the embodiment shown in FIG. 1, the latch mechanism 22 is disposed near an end of the frame 14 disposed opposite the pivot mechanism 20.

Figure 2:
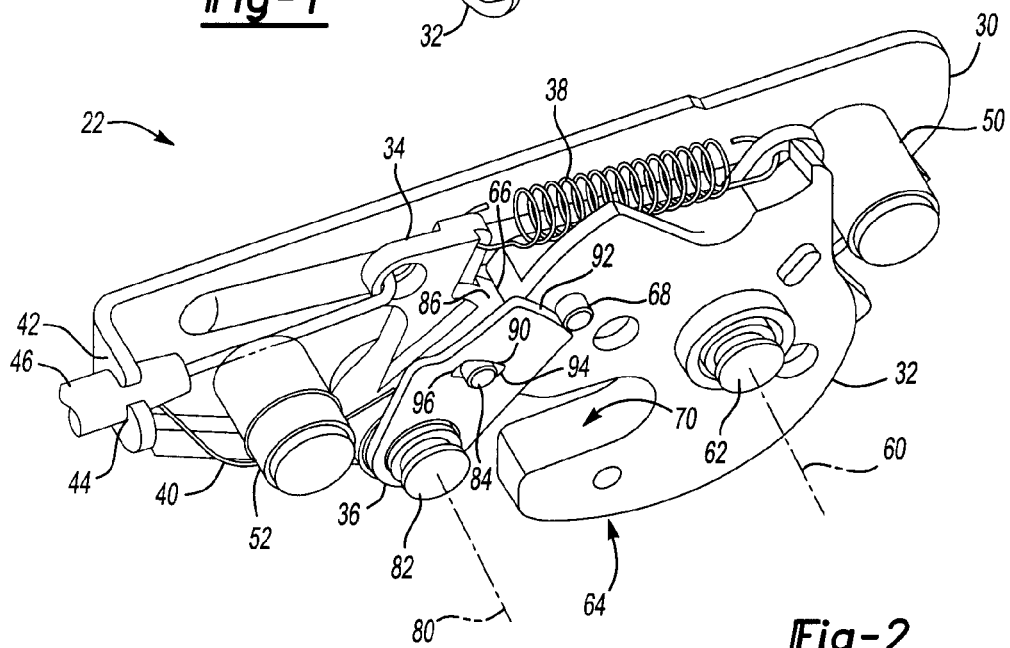
FIG. 2 is a perspective view of the latch mechanism.

Referring to FIG. 2, the latch mechanism 22 is shown in more detail. The latch mechanism 22 may have any suitable configuration. For example, the latch mechanism 22 may include one or more mounting plates 30, a latch 32, a pawl 34, a cam 36, a pawl spring 38, and a cam spring 40. For clarity, the latch mechanism 22 is shown with a single mounting plate, although a second mounting plate may be provided on an opposing side of the latch mechanism 22 as shown in FIG. 1.

The mounting plate 30 may have any suitable configuration. In the embodiment shown, the mounting plate 30 is generally planar and may include an end portion 42. The end portion 42 may extend at an angle from the mounting plate 30 and may include a retaining feature 44, such as an aperture, slot, or clip for securing an actuator 46, such as a cable, cord, or linkage. The mounting plate 30 may be made of any suitable material, such as a metal like aluminum or steel.

The mounting plate 30 may also include first and second members 50, 52. The first and second members 50, 52 may extend between first and second mounting plates in an embodiment having multiple mounting plates. In addition, the first and second fixed members 50, 52 may be configured to limit rotation of the latch 32 and pawl 34, respectively.

The latch 32 may be configured to rotate about a first axis of rotation 60. The latch 32 may be moveably disposed on the mounting plate 30 in any suitable manner. For example, the latch 32 may be rotatably disposed on a first rotation pin 62 that extends from the mounting plate 30 and through an aperture in the latch 32. In such an embodiment, the latch 32 may be held on the first rotation pin 62 by a fastener like a snap ring or may simply be retained between two mounting plates. Alternatively, the latch 32 may include a protrusion or axle that engages the mounting plate 30 to facilitate rotation. The latch 32 may have any suitable configuration and may include a hook portion 64, a pawl engagement surface 66, and a cam engagement feature 68.

The hook portion 64 may include an open ended slot 70 for receiving the mounting feature 28 (as is best shown in FIG. 3). The hook portion 64 and/or additional portions of the latch 32 may be at least partially covered with a resilient material like rubber to inhibit rattling or noise.

The pawl engagement surface 66 may be configured to be engaged by the pawl 34. The pawl engagement surface 66 may be disposed generally above the hook portion 64 and open ended slot 70 as is best shown in FIGS. 2 and 3. In addition, the pawl engagement surface 66 may be slightly concave to facilitate engagement and disengagement by the pawl 34 as will be described in more detail below.

The cam engagement feature 68 have any suitable configuration. In at least one embodiment, the cam engagement feature 68 is configured as a generally cylindrical pin that extends generally parallel to the first axis of rotation 60. The cam engagement feature 68 may be disposed generally above the hook portion 64. In addition, the cam engagement feature 68 may be spaced further from the open ended slot 70 than the pawl engagement surface 66 as is best shown in FIG. 3.

The pawl 34 may be configured to rotate about a second axis of rotation 80. The pawl 34 may be moveably disposed on the mounting plate 30 in any suitable manner. For example, the pawl 34 may be rotatably disposed on a second rotation pin 82 that extends from the mounting plate 30 and through an aperture in the pawl 34. In such an embodiment, the pawl 34 may be held on the second rotation pin 82 by a fastener like a snap ring or may simply be retained between two mounting plates. Alternatively, the pawl 34 may include a protrusion or axle that engages the mounting plate 30 to facilitate rotation. The pawl 34 may have any suitable configuration and may include an engagement feature 84 (also referred to as a pawl pin) and an end surface 86.

The engagement feature 84 may be provided on the pawl 34 to facilitate engagement with the cam 36. The engagement feature 84 may have a male or a female configuration in various embodiments of the present invention. In the embodiment shown in FIG. 2, the engagement feature 84 is configured as a pin and extends generally parallel to the second axis of rotation 80.

The end surface 86 of the pawl 34 may be configured to engage the pawl engagement surface 66 of the latch 32. The end surface 86 may be generally smooth to facilitate engagement and disengagement with the pawl engagement surface 66 as will be described in more detail below. In at least one embodiment, at least a portion of the end surface 86 may be radially disposed about the second axis of rotation 80, thereby providing an end surface 86 with a convex configuration.

The cam 36 may be configured to rotate about the second axis of rotation 80. The cam 36 may be moveably disposed on the mounting plate 30 in any suitable manner. For example, the cam 36 may be rotatably disposed on the second rotation pin 82. In such an embodiment, the cam 36 may be held on the second rotation pin 82 by a fastener like a snap ring or may simply be retained between two mounting plates. Alternatively, the cam 36 may include a protrusion or axle that engages the mounting plate 30 to facilitate rotation. The cam 36 may have any suitable configuration and may include an engagement feature 90 (also referred to as a cam slot) and an end surface 92.

The engagement feature 90 of the cam 36 may be provided to facilitate engagement with the pawl 34. The engagement feature 90 may have a male or a female configuration in various embodiments of the present invention. In the embodiment shown in FIG. 2, the engagement feature 90 is configured as an arcuate slot that is radially disposed about the second axis of rotation 80 and has a first end 94 disposed near the latch 32 and a second end 96 disposed opposite the first end 94. Alternatively, the engagement feature 90 may have a male configuration that is compatible with an engagement feature on the pawl 34 that has a female configuration.

The end surface 92 of the cam 36 may be configured to engage the cam engagement feature 68 of the latch 32. The end surface 92 may be generally smooth to facilitate engagement and disengagement with the cam engagement feature 68 as will be described in more detail below. In at least one embodiment, at least a portion of the end surface 92 may be radially or eccentrically disposed about the second axis of rotation 80, thereby providing an end surface 92 with a convex configuration. In addition, the end surface 92 of the cam 36 may be disposed further from the second axis of rotation 80 than the end surface 86 of the pawl 34. As such, the end surface 86 of the pawl 34 may be spaced apart from the pawl engagement surface 66 when the end surface 92 engages the cam engagement feature 68 as will be described in more detail below.

The pawl spring 38 may bias the pawl 34 toward the latch 32. In at least one embodiment, the pawl spring 38 may include a first end disposed in an aperture in the latch 32 and a second end disposed in an aperture in the pawl 34.

The cam spring 40 may bias the cam 36 toward the latch 32. The cam spring 40 may be provided in any suitable location. In the embodiment shown in FIG. 2, the cam spring 40 is disposed about the second member 52 and includes a first end that engages the cam 36 and a second end that engages the mounting plate 30. Alternatively, the cam spring 40 may be disposed about the second rotation 82 such that the first end engages the cam 36 and the second end engages the second member 52 or the mounting plate 30.

Referring to FIGS. 3-8, operation of the latch mechanism 22 will now be described in more detail.

Referring to FIG. 3, the latch 32 is disposed in a latched position. In the latched position, the mounting feature 28 may be disposed in the open ended slot 70 and rotation of the latch 32 is inhibited. Rotation of the latch 32 may be inhibited by the pawl 34 and/or the cam 36. For example, the pawl 34 may inhibit rotation of the latch 32 when the end surface 86 of the pawl 34 engages the pawl engagement surface 66. Similarly, the cam 36 may inhibit rotation of the latch 32 when the end surface 92 of the cam 36 engages the cam engagement feature 68. In at least one embodiment, the end surface 86 of the pawl 34 and the pawl engagement surface 66 may be spaced apart when the cam end surface 92 engages the cam engagement feature 68, thereby inhibiting the latch 32 from vibrating or rattling against the pawl 34 and/or the mounting feature 28. In addition, the pawl pin 84 may be disposed in an intermediate position of the cam slot 90 when the latch 32 is in the latched position.

Figure 4:
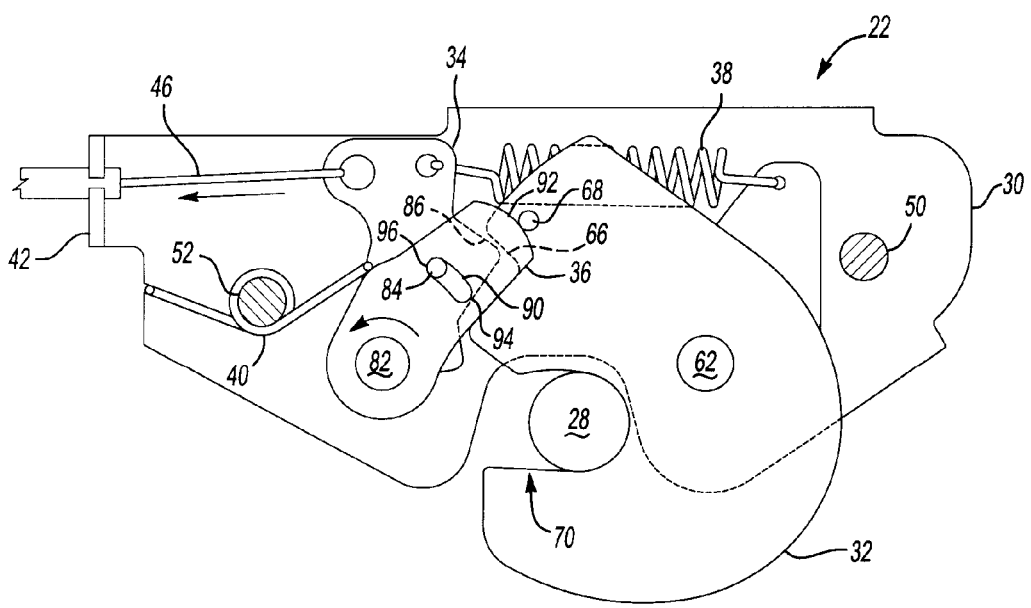
FIG. 4 is a side view of the latch mechanism with a pawl rotated away from the latch.
Figure 5:
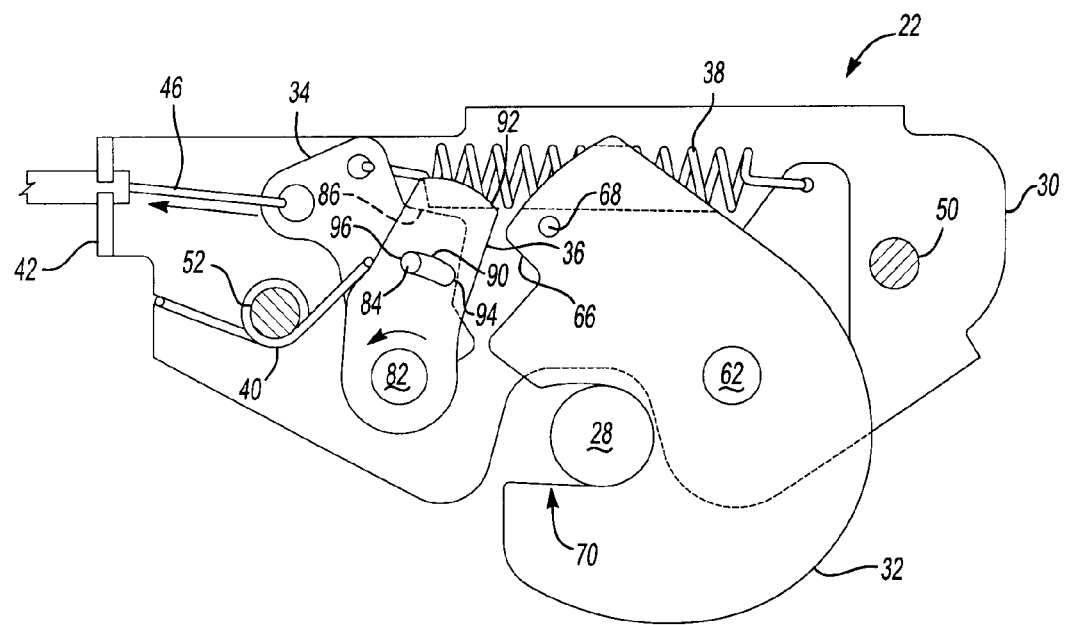
FIG. 5 is a side view of the latch mechanism with the pawl and a cam rotated away from the latch.
Figure 6:
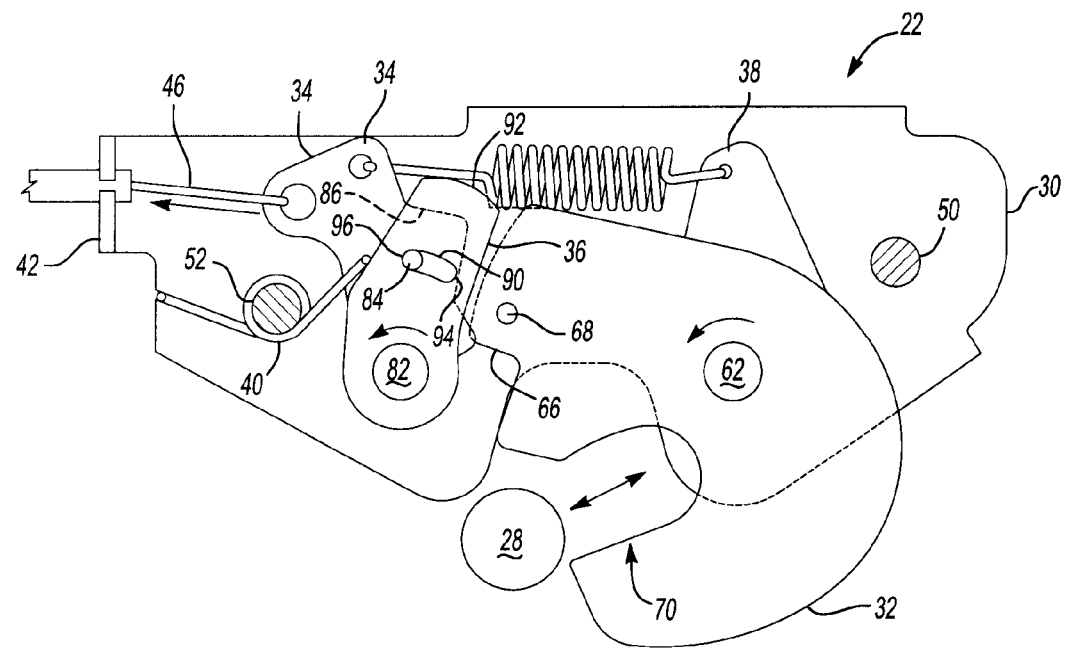
FIG. 6 is a side view of the latch mechanism showing the latch in an unlatched position.

Referring to FIGS. 4-6, a latch release sequence is illustrated. Beginning with FIG. 4, the pawl 34 is rotated away from the latch 32 (indicated by the curved arrow) such that the pawl pin 84 contacts the second end 96 of the cam slot 90. The pawl 34 may be rotated using the actuator 46, which may be actuated in the direction indicated by the straight arrow. The actuator 46 may be connected to a handle or any suitable mechanical or electrical actuation device at a second end (not shown). Moreover, the actuation force applied with the actuator 46 overcomes the biasing force of the pawl spring 38, which may lengthen the pawl spring 38.

Referring to FIG. 5, the pawl 34 and cam 36 are rotated away from the latch 32 to permit the latch 32 to rotate in the direction indicated by the curved arrow. More specifically, upon the application of sufficient force by the actuator 46, the pawl 34 continues to rotate away from the latch 32 and the pawl pin 84 exerts force on the second end 96 of the cam slot 36 to rotate the cam 36 to disengage the cam 36 from the cam engagement feature 68. The pawl 34 and cam 36 are then spaced apart from the latch 32, thereby permitting the latch 32 to rotate. The cam 36 and pawl 34 may disengage from the latch 32 at approximately the same time or the cam 36 may disengage from the latch 32 before the pawl 34 disengages from the latch 32 in various embodiments of the present invention.

Referring to FIG. 6, the latch 32 is shown in an unlatched position. The latch 32 may be actuated toward the unlatched position in response to force exerted upon the vehicle seat 10. For instance, upward force exerted upon the seat 10 may cause the latch 32 to rotate about the first axis of rotation 60 as indicated by the curved arrow such that the mounting feature 28 may exit or enter the open ended slot 64 as indicated by the double arrow line. In at least one embodiment, the latch 32 may be rotated at least in part by force exerted by the pawl spring 38.

Figure 7:
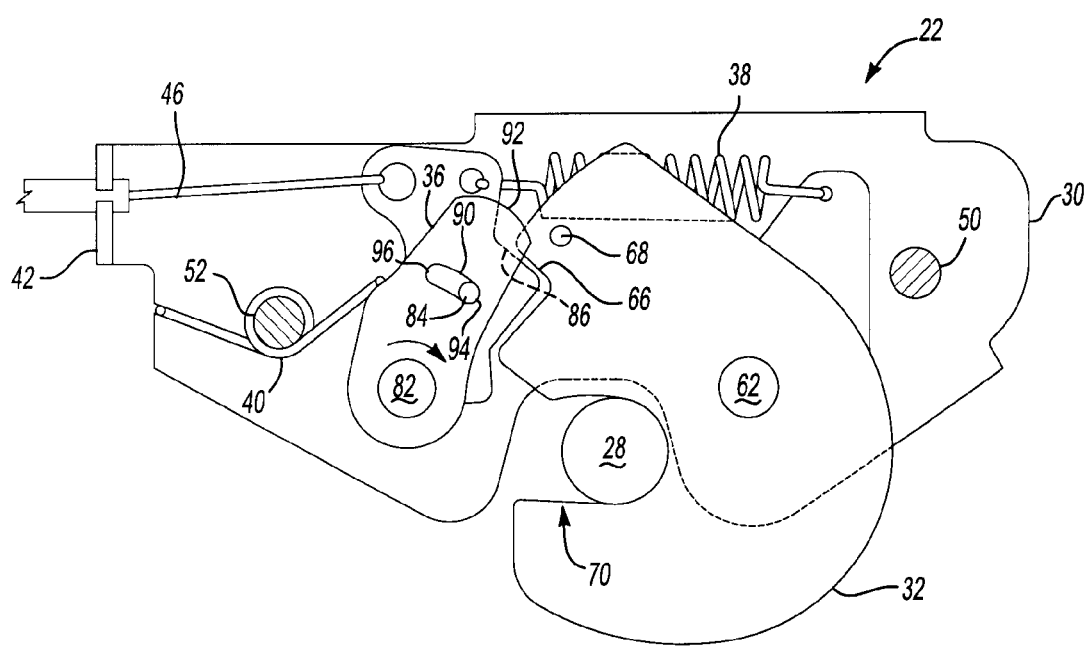
FIG. 7 is a side view of the latch mechanism showing the latch in a latched position and the pawl rotated toward the latch.

Referring to FIG. 7, movement of the latch 32 from the unlatched position toward the latched position is illustrated. Movement toward the latched position may be accomplished when the actuator 46 is released and the mounting feature 28 is at least partially disposed in the open ended slot 70. For instance, movement of the vehicle seat 10 toward the mounting feature 28 may allow the mounting feature 28 to exert force on the upper surface of the open ended slot 70, thereby causing the latch 32 to rotate about the first axis of rotation 60 to the position shown in FIG. 7.

After the latch 32 is rotated to the position shown in FIG. 7, the pawl 34 and cam 36 may return to the positions shown in FIG. 3. More specifically, the pawl 34 and cam 36 are rotated toward the latch 32 in the direction indicated by the curved arrow. Rotation of the pawl 34 toward the latch 32 may be caused by the biasing force exerted by the pawl spring 38. Rotation of the cam 36 toward the latch 32 may be caused by the biasing force exerted by the cam spring 40 and/or the pawl 34. For example, the pawl pin 84 may engage the first end 94 of the cam slot 90 to help rotate the cam 36 until the pawl 34 contacts the latch 32.

The biasing force exerted by the cam spring 40 may drive the end surface 92 of the cam 36 into engagement with the cam engagement feature 68 to wedge the cam 36 against the latch 32. As the cam engagement feature 68 moves along the end surface 92, the end surface 86 of the pawl 34 and the pawl engagement surface 66 may be spaced apart and the latch mechanism 22 may return to the configuration shown in FIG. 3.

In one or more embodiments of the present invention, the cam 36 may be designed to deform or disengage from the cam engagement feature 68 during a vehicle impact event. Upon deformation or disengagement of the cam 36, rotation of the latch 32 may be inhibited by the pawl 34. In addition, the pawl 34 and the cam 36 may engage the latch 32 at approximately the same or different times in one or more embodiments of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A latch mechanism for a vehicle seat, the latch mechanism comprising:
    a latch that rotates about a first axis of rotation;
    a cam that rotates about a second axis of rotation between a first cam position, wherein the cam engages the latch to inhibit vibration, and a second cam position, wherein the cam does not engage the latch, the cam having a slot that is radially disposed relative to the second axis of rotation; and
    a pawl that rotates about the second axis of rotation between a first pawl position, wherein the pawl inhibits rotation of the latch about the first axis of rotation, and a second pawl position, wherein the pawl does not inhibit rotation of the latch about the first axis of rotation, the pawl having an engagement pin disposed generally parallel to the second axis of rotation and extending into the slot;
    wherein the engagement pin engages an end of the slot to rotate the cam from the first cam position to the second cam position when the pawl is rotated from the first pawl position to the second pawl position.

2. The latch mechanism of claim 1 wherein the cam further comprises an end surface radially disposed relative to the second axis of rotation that engages the latch to inhibit the latch from rattling.

3. The latch mechanism of claim 1 wherein rotation of the latch is inhibited when at least one of the cam and the pawl engages the latch.

4. The latch mechanism of claim 1 wherein the pawl engages the latch before the cam engages the latch.

5. The latch mechanism of claim 1 further comprising a first spring for biasing the pawl toward the latch and a second spring for biasing the cam toward the latch.

6. A vehicle seat having a latch mechanism for detachably mounting the vehicle seat to a vehicle, the vehicle seat comprising:
    a seat bottom;
    a latch mechanism disposed on the seat bottom, the latch mechanism including:
    a mounting plate;
    a latch disposed on the mounting plate and rotatable between a latched position and an unlatched position, the latch having a hook portion;
    a cam rotatably disposed on the mounting plate, the cam having a slot; and
    a pawl rotatably disposed on the mounting plate, the pawl having an engagement pin disposed in the slot; and an actuator connected to the pawl;
    wherein actuation of the actuator rotates the pawl away from the latch such that the engagement pin moves within the slot to engage the cam and rotate the cam away from the latch, thereby permitting the latch to rotate from the latched position to the unlatched position.

7. The vehicle seat of claim 6 further comprising a spring for biasing the pawl toward the latch.

8. The vehicle seat of claim 6 wherein the slot is radially disposed relative to a second axis of rotation about which the cam rotates.

9. The vehicle seat of claim 6 further comprising a cam spring that biases the cam toward the latch, wherein at least one of the cam spring and the pawl moves the cam toward the latch when the first actuator is released.

10. The vehicle seat of claim 6 wherein the latch is rotatable about a first axis of rotation and the cam and pawl are rotatable about a second axis of rotation.

\* \* \* \* \*

UNITED STATES PATENT AND TRADEMARK OFFICE
CERTIFICATE OF CORRECTION

PATENT NO. : 7,575,280 B2
APPLICATION NO. : 11/275451
DATED : August 18, 2009
INVENTOR(S) : Palomba et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 703 days.

Signed and Sealed this

Seventh Day of September, 2010

David J. Kappos
*Director of the United States Patent and Trademark Office*